United States Patent
Panikkar et al.

(10) Patent No.: US 12,008,134 B2
(45) Date of Patent: Jun. 11, 2024

(54) ARTIFICIAL INTELLIGENCE-BASED DATA SECURITY MANAGEMENT

(71) Applicant: Dell Products L.P., Round Rock, TX (US)

(72) Inventors: Shibi Panikkar, Bangalore (IN); Thiru Shama, Bangalore (IN); Chetan Pudiyanda Somaiah, Bangalore (IN)

(73) Assignee: Dell Products L.P., Round Rock, TX (US)

(*) Notice: Subject to any disclaimer, the term of this patent is extended or adjusted under 35 U.S.C. 154(b) by 281 days.

(21) Appl. No.: 17/332,467

(22) Filed: May 27, 2021

(65) Prior Publication Data

US 2022/0382902 A1    Dec. 1, 2022

(51) Int. Cl.
*G06F 21/31* (2013.01)
*G06F 21/60* (2013.01)
*G06F 21/62* (2013.01)
*G06N 20/00* (2019.01)

(52) U.S. Cl.
CPC .......... *G06F 21/6245* (2013.01); *G06F 21/31* (2013.01); *G06F 21/604* (2013.01); *G06N 20/00* (2019.01)

(58) Field of Classification Search
CPC ...... G06F 21/6245; G06F 21/31; G06N 20/00
USPC ....................................................... 726/26
See application file for complete search history.

(56) References Cited

U.S. PATENT DOCUMENTS

| | | | |
|---|---|---|---|
| 2019/0311137 A1* | 10/2019 | Mallya | G06N 20/00 |
| 2020/0125575 A1* | 4/2020 | Ghoshal | G06F 3/0482 |
| 2021/0209355 A1* | 7/2021 | Alikhani | G06N 5/01 |
| 2021/0295822 A1* | 9/2021 | Tomkins | G06F 16/90332 |
| 2021/0352078 A1* | 11/2021 | Mallya | G06N 20/00 |
| 2022/0067216 A1* | 3/2022 | Bokade | G06F 21/78 |

OTHER PUBLICATIONS

I-Hsien Liu; Differential Privacy Protection with Group Onion Routing based on AI-based URL Classification; ACM:2020; pp. 1-6.*
Wikipedia, "Tableau Software," https://en.wikipedia.org/wiki/Tableau_Software, May 19, 2021, 6 pages.
(Continued)

*Primary Examiner* — Monjur Rahim
(74) *Attorney, Agent, or Firm* — Ryan, Mason & Lewis, LLP

(57) ABSTRACT

Artificial intelligence-based data security management techniques are disclosed. For example, a method comprises the following steps. A dataset is downloaded from a data source. The method detects whether or not the dataset contains at least a subset of data of a given security-based data type, wherein the detection is performed in accordance with an artificial intelligence model. A machine-computed security level classification is generated for the dataset by automatically selecting one of a plurality of security level classifications based on the detection. The machine-computed security level classification is compared with a user-generated security level classification manually selected from a plurality of security level classifications. One or more actions are caused to be taken based on the comparison.

20 Claims, 8 Drawing Sheets

(56) References Cited

OTHER PUBLICATIONS

L. Dignan, "Tableau integrates Einstein Analytics, Becomes the Analytics Bridge in Salesforce Ecosystem," https://www.zdnet.com/article/tableau-integrates-einstein-analytics-becomes-the-analytics-bridge-in-salesforce-ecosystem/, Oct. 6, 2020, 18 pages.
Tableau Software, LLC, "AI + Analytics," https://www.tableau.com/solutions/ai-analytics, Accessed May 24, 2021, 11 pages.

* cited by examiner

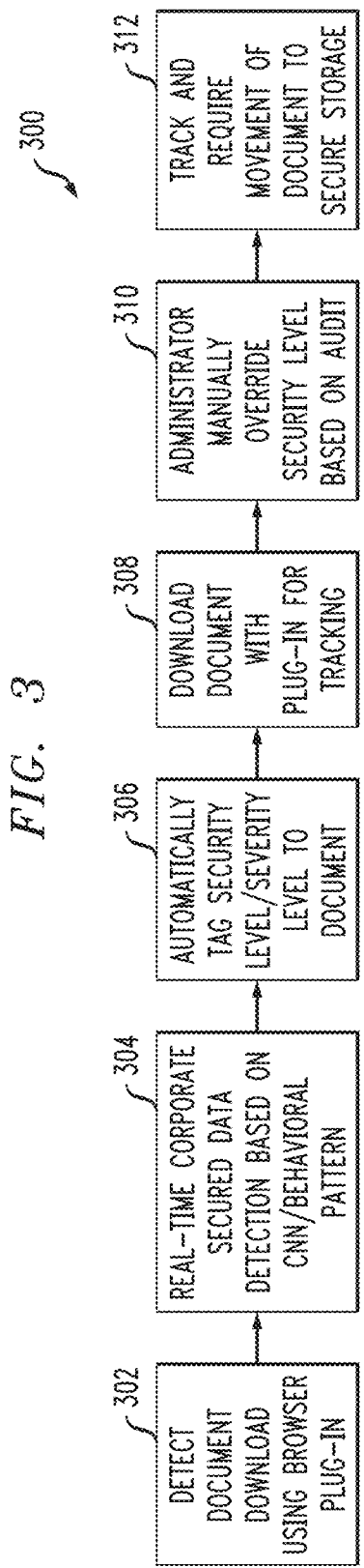

FIG. 4

```
var downloadId;
//API URL for the AI Model
private const string URL = "http://localhost.com/{sample}verifySecurity";
static HttpClient client = new HttpClient();
chrome.downloads.onCreated.addListener(function (downloadItem)
{
    downloadId = downloadItem.id;

//Read Sample Data from downloaded document

// Call AI Model with Sample Data

HttpResponseMessage response = await client.PostAsJsonAsync(
                URL, product);
            response.EnsureSuccessStatusCode();

// return URI of the created resource.
            return response.Headers.Location;

string file location = downloadItem.filename;

// Apply Predicted Security classification by calling Titan API
});
```

FIG. 5

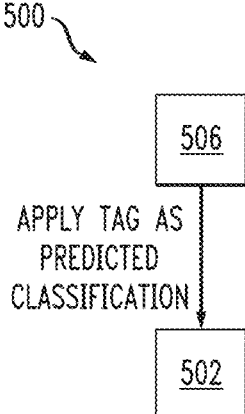
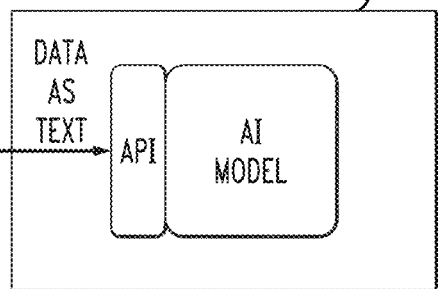

*FIG. 6*

```
model = Sequential()
# generate a word embeddings from payloads
model.add(Embedding(num_words, 32, input_length=max_payload_length))
# regularize word embeddings through drop out
model.add(Dropout(0.5))
# use an RNN of the LSTM type
model.add(LSTM(64, recurrent_dropout=0.5))
model.add(Dropout(0.5))
model.add(Dense(1, activation='sigmoid'))
model.compile(loss='binary_crossentropy', optimizer='adam' , metrics=['accuracy'])
# train
model.fit(X_train, Y_train, validation_split=0.25, epochs=100, batch_size=128)
```

$ python shibiapi/train.py

| LAYER (TYPE) | OUTPUT SHAPE | PARAM # |
|---|---|---|
| embedding_1 (Embedding) | (Node, 1024, 32) | 1888 |
| dropout_1 (Dropout) | (Node, 1024, 32) | 0 |
| lstm_1 (LSTM) | (Node, 64) | 24832 |
| dropout_2 (Dropout) | (Node, 64) | 0 |
| dense_1 (Dense) | (Node, 1) | 65 |

Total params: 26, 785
Trainable params: 26, 785
Non-trainable params: 0

None
Instructions for updating:
Use tf.cast instead.
Train on 23559 samples, validate on 7854 samples
Epoch 1/100
23559/23559 [==============================] - 9s 11ms/step - loss: 0.5225 - acc: 0.7482 - val_loss: 0.3550 - val_acc: 0.8988
Epoch 2/100
23559/23559 [==============================] - 9s 11ms/step - loss: 0.4002 - acc: 0.8550 - val_loss: 0.3812 - val_acc: 0.8794
Epoch 3/100
23559/23559 [==============================] - 9s 11ms/step - loss: 0.4479 - acc: 0.8216 - val_loss: 0.4758 - val_acc: 0.7926

.....
Model Accuracy: 99.71%

ARTIFICIAL INTELLIGENCE-BASED DATA SECURITY MANAGEMENT

FIELD

The field relates generally to information processing systems, and more particularly to data security management in such information processing systems.

BACKGROUND

Data security is a major focus of current corporate security laws. As such, corporations and other organizations are taking measures to attempt to secure their documents and other data to avoid compliance penalties, as well as to gain trust from their customers for securing their data. However, a significant amount of the effort of an organization to secure data is done manually or otherwise relies on human judgement. Such existing data security management has significant shortcomings due at least in part to human error.

SUMMARY

Illustrative embodiments provide artificial intelligence-based data security management techniques in an information processing system.

For example, in an illustrative embodiment, a method comprises the following steps. A dataset is downloaded from a data source. The method detects whether or not the dataset contains at least a subset of data of a given security-based data type, wherein the detection is performed in accordance with an artificial intelligence model. A machine-computed security level classification is generated for the dataset by automatically selecting one of a plurality of security level classifications based on the detection. The machine-computed security level classification is compared with a user-generated security level classification manually selected from a plurality of security level classifications. One or more actions are caused to be taken based on the comparison.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide artificial intelligence-based security level tagging for extracted documents (i.e., datasets) with end-to-end tracking of highly restricted documents until the document is safeguarded in a secure repository. Illustrative embodiments also enable security personnel to check a discrepancy with respect to the extracted document security levels (e.g., in case of a user manually overriding with a lower security level) and set a correct security level, cause the document to be encrypted, or even cause the document to be deleted.

These and other illustrative embodiments include, without limitation, apparatus, systems, methods and computer program products comprising processor-readable storage media.

BRIEF DESCRIPTION OF THE DRAWINGS

FIG. 3 illustrates an artificial intelligence-based data security management process according to an illustrative embodiment.

FIG. 4 illustrates browser-based plug-in software code for artificial intelligence-based data security management according to an illustrative embodiment.

FIG. 5 illustrates a process of providing data from an extracted document to an artificial intelligence model used for data security management according to an illustrative embodiment.

FIG. 6 illustrates software code for an artificial intelligence model used for data security management according to an illustrative embodiment.

FIG. 7 illustrates an example training scenario for an artificial intelligence model used for data security management according to an illustrative embodiment.

DETAILED DESCRIPTION

Figure 1:
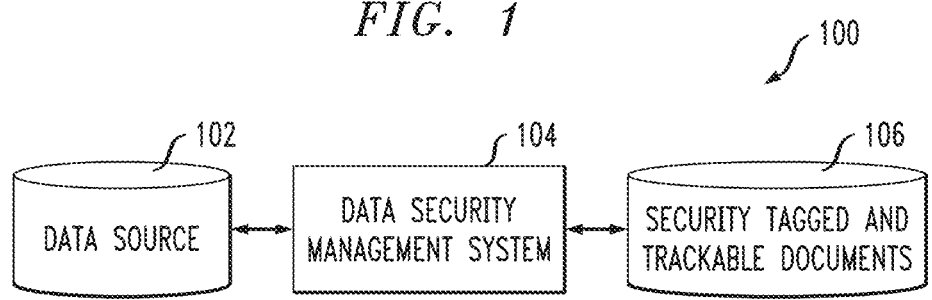
FIG. 1 illustrates a high-level view of an artificial intelligence-based data security management system according to an illustrative embodiment.

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud and non-cloud computing and storage systems, as well as other types of processing systems comprising various combinations of physical and virtual processing resources. An information processing system as the term is used herein also encompasses one or more edge computing networks (e.g., customer data centers), and one or more fog computing networks which are typically regional networks (e.g., regional data centers) coupled between one or more edge computing networks and one or more cloud computing networks (e.g., core data center). It is to be understood that cloud, fog and edge computing networks can include private, public, and/or combinations of private/public (hybrid) computing architectures.

Organizations typically extract data from data sources to create documents. In some cases, the data sources from which data may be extracted are accessed by or otherwise managed by a data visualization tool such as, but not limited to, Tableau (Tableau Software LLC, Seattle WA). The Tableau platform connects and extracts data stored in essentially any database or other data source (e.g., data sources in formats such as Microsoft Excel, Microsoft Word, Adobe pdf, Oracle databases, cloud-based databases such as Amazon Web Services, Microsoft Azure SQL databases, Google Cloud SQL databases, etc.). Tableau uses data connectors to enable a business user to connect to any data source so as to be able to extract at least some subset of data from the data source. The extracted data (e.g., document) can then be worked with by the business user (e.g., data analyst, data engineer, etc.) for whatever the intended use. For example, the extracted documents may be used for making important decisions, internal presentations, and/or discussions with vendors.

However, it is realized that these extracted documents may contain personally identifiable information (PII) about customers and/or corporation-specific secured information about their organization. Examples of customer PII may include, but are not limited to, tax identification numbers, mailing addresses, email addresses, etc. Examples of corporation-specific secured information may include, but is not limited to, business roadmap planning, upcoming products, corporate finance, etc.

Security level tagging is available in Tableau and typically includes labeling extracted documents as "internal," "external," "restricted" and "highly restricted." However, it is up to the individual who is tagging the document to select the security level which can thus lead to human error. There is also typically no tracking performed for these tagged documents. For example, such documents may remain stored in an unsecured manner in the laptop of the user for an unspecified length of time regardless of the security level tag manually assigned to the document.

Illustrative embodiments address the above and other issues with existing document security by improved tagging of extracted documents and tracking their movement/storage location. By way of example, illustrative embodiments provide the following functionalities. Illustrative embodiments predict the security level of the extracted document at the time of download (e.g., from the Tableau platform) using a browser plug-in (e.g., on the laptop of a user) connected to a neural network behavioral pattern. Further, illustrative embodiments enable cybersecurity review in order to update the security level in case of a discrepancy in a predicted security level and/or a user selected security level, and apply the updated security level using a lightweight event modeling framework. Still further, using one or more automated machine learning (ML) algorithms, illustrative embodiments enable tracking of highly secure documents (e.g., position and name) and remind or require a user to move such documents to a secure storage and/or dispose of the documents immediately after use or at some predetermined scheduled time in the future. Note that an ML algorithm is considered part of artificial intelligence (AI) technology where the computer-implemented algorithm learns from input data so as to improve subsequent output decisions.

FIG. 1 illustrates a high-level view of an artificial intelligence-based data security management system and information processing environment 100, according to an illustrative embodiment, configured to provide one or more of the above-mentioned functionalities as well as other functionalities to be further described herein. As shown, a data source 102 (e.g., Tableau platform and/or some other data source(s)) provides extracted data to a data security management system 104 which generates one or more security tagged and trackable documents 106 from at least a portion of the extracted data. Details of data security management system 104 will be illustratively described herein the context of subsequent figures.

Figure 2:
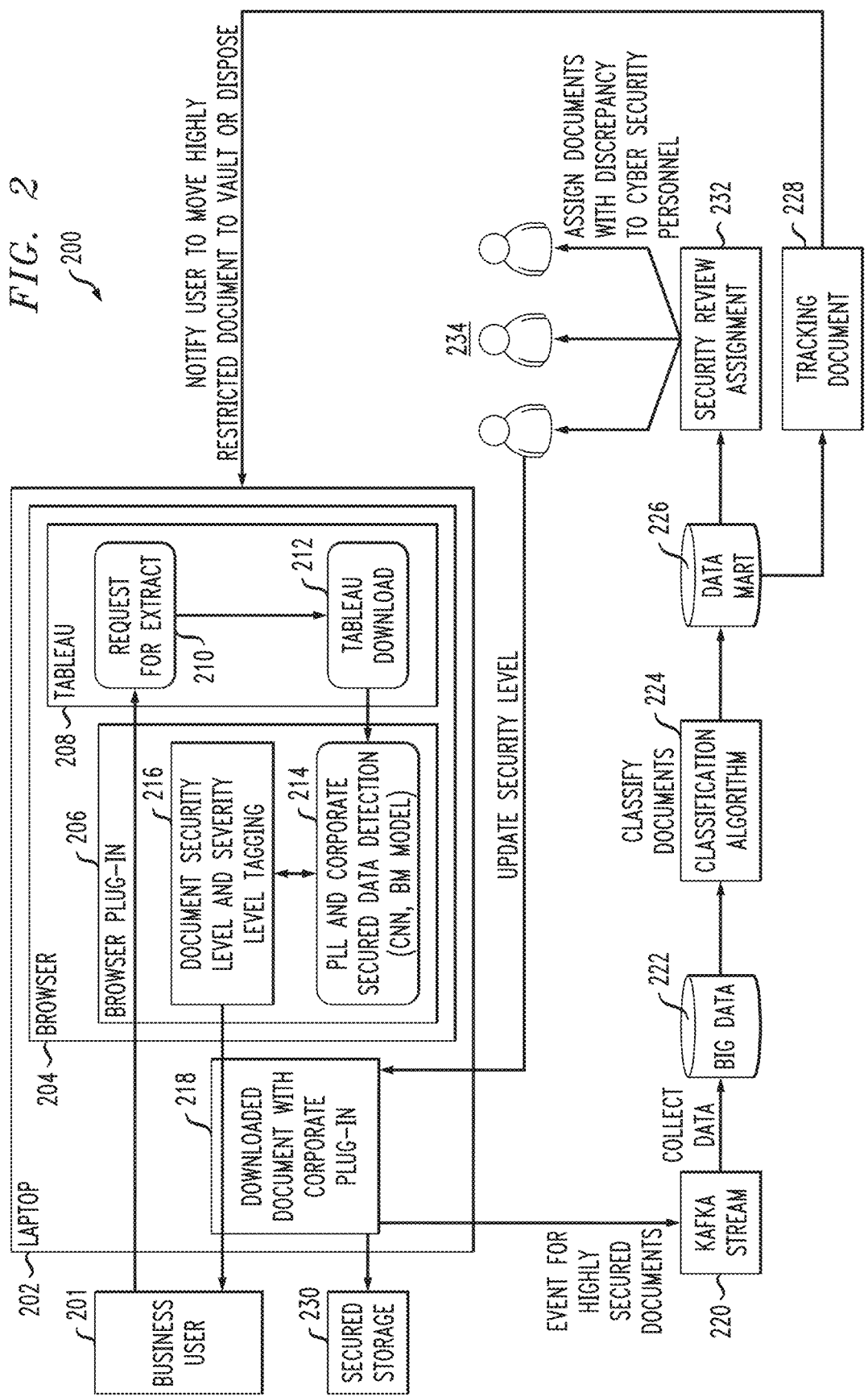
FIG. 2 illustrates details of an artificial intelligence-based data security management system according to an illustrative embodiment.

Turning now to FIG. 2, details are shown of an artificial intelligence-based data security management system and information processing environment 200, according to an illustrative embodiment, which can be considered to be an example of artificial intelligence-based data security management system and information processing environment 100 of FIG. 1. As will be further explained in the context of the browser-based embodiment of FIG. 2, an AI model is provided for detecting confidential data in a document for different security levels (e.g., using Natural Language Toolkit regular expressions or a similar pattern recognizing algorithm), and a Representational State Transfer (REST) Application Programming Interface (API) is exposed for interfacing with the system. Since the data extraction happens through a browser, the FIG. 2 embodiment provides a browser plug-in to call the AI model to predict the security level and generate a unique identifier for that document at the time of extraction and download from the data source. In one or more illustrative embodiments, the unique identifier (ID) is a Secure ID comprising a unique user ID and a timestamp. This SecureID may be used by the system to track the document. Even though a user may rename the file, the Secure ID will be the same for that renamed document. A browser plug-in tags this document with the predicted security level against the Secure ID.

More particularly, as shown in FIG. 2, a laptop 202 (or other user computing device) of a user 201 comprises a browser 204. The browser 204 may be a web browser for accessing the Internet or some other information network, and may be configured to execute a browser plug-in module 206. The browser plug-in module 206 communicates with a data source access platform such as, but not limited to, Tableau platform 208. As further shown, user 201, via browser plug-in module 206, generates a data extraction request 210 which is sent to Tableau platform 208. The data is extracted from the corresponding data source and downloaded 212 from the Tableau platform 208 to browser plug-in module 206. In the illustrative embodiments, the extracted data is referred to as a document.

In browser plug-in module 206, any customer PII and/or corporation-specific secured information is detected 214 using an AI model. The AI model, in some embodiments, can be a convolutional neural network (CNN) which is a well-known recognition and classification machine learning algorithm. The AI model can alternatively be another form of a machine learning model and, in some embodiments, multiple AI models can be used to detect customer PII and corporation-specific secured information in the extracted data received from the Tableau platform 208. Still further, the AI model may also utilize a behavior model (BM).

Based on the customer PII and/or corporation-specific secured information detected in the extracted data, automated security level tagging 216 is performed on the extracted document. In some embodiments, secure data detection 214 and security level tagging 216 can be combined using Natural Language Toolkit (NLTK) regular expressions or a similar pattern recognizing algorithm and results exposed via a REST API.

Since the data extraction occurs through browser 204, browser plug-in module 206 can call the AI model to predict the security level and generate a unique identifier for that extracted data (e.g., document), such as mentioned above, in the form of a SecureID (e.g., unique user identifier+timestamp). This SecureID can be used to track the document. Even though user 201 may rename the document at the time of extraction (Tableau platform 208) and download (data extraction request 210), this SecureID remains the same for the renamed document.

Further, browser plug-in module 206 tags the document with a predicted severity against the SecureID. At the time of saving the document, depicted as downloaded document 218 in FIG. 2, a document plug-in (e.g., Titan) queries user 201 to tag security levels, e.g., "external," "internal," "restricted," and "highly restricted," which are typical manually selected security levels offered by Tableau platform 208. How each corporation interprets the security levels depends on the corporation and therefore may be different from one corporation to another. For instance, in one example, "external" indicates that the document can be shared outside the corporation (e.g., shared with third parties), while "internal" indicates that document can only be shared within the corporation but by anyone in the corporation. As such, "restricted" and "highly restricted" would specify one or more subgroups within the corporation that can access the document. In some cases, but not all, the internal parties that may access a document tagged as "highly restricted" could be a subgroup within the internal parties that can access a document tagged as "restricted."

However, as mentioned above, the downloaded document 218 is also automatically tagged with a severity level that reflects the level of need for one or more security experts to review the security assigned to the document. By way of example only, in some embodiments, the document severity levels include "high-need review," "high," "medium," and "low." Alternative embodiments can have more, less, and/or one or more different severity and security levels tags than those mentioned here.

In an illustrative embodiment, the severity level tag and security level tag (automatically predicted and user selected) have the following interplay. However, it is to be understood that this is only one example and other examples are contemplated.

A document is marked with a severity level of "high-need review" when the automatically predicted security level is "high" but the user selects a lower security level, e.g., AI model predicts the document is "highly restricted" and the user selects "external." This document will be marked as having a discrepancy (e.g., a significant disparity between the machine learning-generated security tag and the user selected security tag) and in need of a cybersecurity review.

Further, a document is marked with a severity level of "high" when the automatically predicted security level is "highly restricted" and the user also selects "highly restricted." The assumption is the user 201 will use this document thoughtfully and there is currently no cybersecurity review needed; however, since the automatic prediction tagged the document as "highly-restricted," the system still tracks the document to monitor whether or not the user security level is lowered and thus will automatically trigger a cybersecurity review.

Still further, a document is marked with a severity level of "medium" when the automatically predicted security level is "internal" and the user also selects "highly restricted." In this scenario, the AI model is retrained using this information since it illustrates some disparity/discrepancy.

Lastly, in this example, a document is marked with a severity level of "low" when the automatically predicted security level is "low" and the user also selects "low."

Assuming a document is identified for cybersecurity review (e.g., as described above, the AI model predicts the document is "highly restricted" but the user selects "external," or after monitoring that a user lowers the security level on a document that was previously tagged via automatic prediction as a "highly restricted" document) or the document is otherwise identified as a highly secure document, the document is provided to a processing module such as a Kafka stream processing module 220 (Apache Software Foundation).

Kafka stream processing module 220 uses stream partitions and stream tasks as logical units of a parallelism model wherein each stream partition is an ordered sequence of data records and maps to a Kafka topic partition. A data record in the stream maps to a Kafka message from that topic. Thus, Kafka stream processing module 220 maps an input topic to an output topic. If the user 201 selected a security level (classification) lower than the predicted security level tag, the system can alert the user 201 showing the predicted classification with sample data. Then, even if the user 201 still saves the document with the lower classification, an event is raised to the Kafka stream processing module 220 with the SecureID of the document, the current folder location on laptop 202, the machine name of laptop 202, the username of user 201, the current security level classification, the predicted security level classification, and the domain region. If the predicted classification is low and the user selected classification is high, then the data is pushed to the Kafka stream processing module 220 for re-training the model so that the model can learn. When the document is marked as highly restricted, the document is moved from the current folder location to another folder, the document is renamed, and an event is raised to the Kafka stream processing module 220 with the above information. The copy of the document with all other details is then pushed to big data store 222.

Classification algorithm 224 classifies the data stored in big data store 222 based on domain region, security level classification, discrepancy (if predicted and assigned are different). The classification results are stored in a data mart 226. The document with the discrepancy is automatically assigned 232 to cybersecurity personnel from a group of cybersecurity personnel 234. Cybersecurity personnel 234 review the document and are enabled to access the document in the user machine (user's laptop 202) and apply the correct data classification to the document and, if required, encrypt the document or even delete the document from the user machine. If the document predicted classification is high and cybersecurity personnel 234 agree with the user marked classification as low, this data is pushed to Kafka stream processing module 220 to re-train the model so that the model can learn. Document tracking 228 is also performed. For example, if the current location of the highly restricted document is in user's laptop 202, the system sends a notification to the user 201 to either move the document to a secured repository, e.g., secured storage 230 or delete the same after a configurable period with frequency. If after a number of notifications (e.g., three) go unheeded by the user 201, the system removes the document from the user's laptop 202 and moves it secured storage 230.

FIG. 3 illustrates a high-level methodology 300 for data security management according to an illustrative embodiment. Methodology 300 can be viewed as comprising steps that can be performed by artificial intelligence-based data security management system and information processing environment 200, as well as other systems with functionalities according to illustrative embodiments. As shown, step 302 detects the download of a document (e.g., extracted data from Tableau or some other data source) using a browser plug-in module (e.g., browser plug-in module 206). Then, in step 304, confidential or otherwise highly secure data is detected in the document extracted in step 302. As mentioned above, detection can be performed using a CNN/behavioral model or pattern. Step 306 automatically tags a predicted security level and severity level as explained above. Step 308 downloads the tagged document with a plug-in for tracking from the browser plug-in module to another part of the user's device. In step 310, based on an audit (cybersecurity review), an administrator can override the security level tagged to the document. The document is tracked and, as needed, the user is instructed to delete the document or move the document to a secure storage off of the user's device in step 312.

Accordingly, by way of further example, the browser plug-in module (e.g., 206 in FIG. 2) in the user's laptop has two main responsibilities: (i) scan the extracted downloaded document which, in an illustrative embodiment, can be structured or tabular data, and call an API of the AI model (e.g., 214 in FIG. 2) by passing random rows of data from the structured data document to the AI model to predict if the extracted document contains confidential/secured data or not; and (ii) if confidential/secured data is present, the AI model classifies the data and applies appropriate security levels or classifications (e.g., external, internal, restricted, highly restricted), as explained in detail above. FIG. 4 illustrates an example of software code 400 for a Google Chrome browser-based plug-in and C# format.

FIG. 5 illustrates an example 500 depicting the process of providing data as text from an extracted document 502 to the AI model 504 via its API, which returns a predicted classification that is applied 506 to the extracted document as a tag.

Illustrative embodiments are capable of utilizing a variety of AI models for secure/confidential data detection. In addition to other AI models mentioned herein, some embodiments utilize an AI model based on a recurrent neural network (RNN) and long short-term memory (LSTM). RNN is a class of artificial neural networks where connections between nodes form a directed graph along a temporal sequence enabling the network to exhibit temporal dynamic behavior. LSTM is a particular RNN-based architecture used in machine learning. The AI model can be trained with training data that is available within the organization and some generic data from the Internet, and can be updated by continuously adding new training data to re-learn. In a TensorFlow and Python-based implementation, the LSTM hidden layer is fed with word embeddings, e.g., a dictionary derived from ingesting text from payloads, with separate dropout layers to reduce overfitting; and finally an output layer to produce the PII classification.

FIG. 6 illustrates an example TensorFlow AI model 600 using 100 epochs given that is where the model converges with a synthetic dataset. FIG. 7 illustrates an example Python training scenario 700 for the TensorFlow AI model 600 of FIG. 6.

Figure 8:
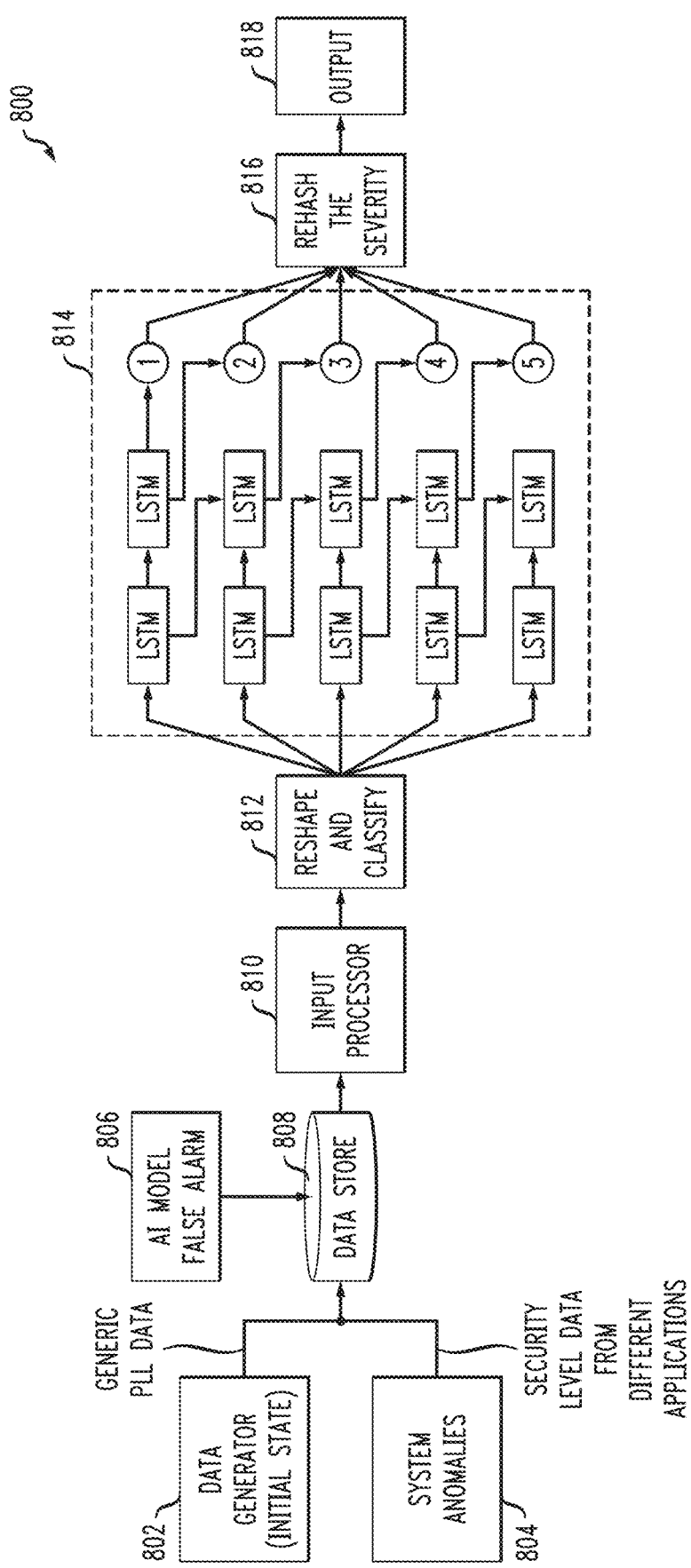
FIG. 8 illustrates a training/re-training process for an artificial intelligence model used for data security management according to an illustrative embodiment.

FIG. 8 illustrates training/re-training of an LSTM-based model architecture 800. As shown, initial state data generator 802 provides generic PII data, system anomalies 804 provide security level data from different applications. The generic PII data and the security level data, along with AI model false alarm data 806, is stored in data store 808. Input processor 810 reads the data in data store 808 and provides at least a portion of the data to reshape and classify module 812. LSTM framework 814 receives the outputs of reshape and classify module 812 and provides outputs to severity rehash module 816 which then generates model output 818.

Accordingly, the AI model is trained with data indicative of initial false alarms and different anomalies in the system, and in a browser-based embodiment such as, for example, the FIG. 2 embodiment, the AI model is exposed as a service to be called from a browser plug-in to obtain the security level classification. It is to be appreciated that there can be a scenario where cybersecurity personnel initially receive more messages to be reviewed but, as the model is continuously re-trained, the data becomes more and more accurate and the AI model yields better results. Furthermore, the AI model can develop to the point where the cybersecurity personnel are no longer needed and the system itself can decide to override the manual classifications of the user. Still further, as the input data increases, the dense layer and reshape layer can occur before the LSTM framework.

Accordingly, as explained in detail herein, illustrative embodiments provide data security management techniques comprising a methodology of: downloading a dataset from a data source; detecting whether or not the dataset contains at least a subset of data of a given security-based data type (e.g., PII/entity-sensitive such as corporate secure data), wherein the detection is performed in accordance with an artificial intelligence model; generating a machine-computed security level classification (e.g., predicted security level) for the dataset by automatically selecting one of a plurality of security level classifications based on the detection; comparing the machine-computed security level classification with a user-generated security level classification (e.g., user security level) manually selected from a plurality of security level classifications; and causing one or more actions to be taken based on the comparison.

For example, when the comparison results in the machine-computed security level classification being higher than the user-generated security level classification, the one or more actions comprise causing a review of the dataset. Following the review, the one or more actions comprise changing the current security level classification of the dataset.

Further, when the comparison results in the machine-computed security level classification being lower than the user-selected security level classification, the one or more actions comprise retraining the artificial intelligence model.

Still further, when the machine-computed security level classification is one of one or more high security level classifications, the one or more actions comprise at least one of: relocating the dataset from a device that downloaded the dataset to a secure storage location; deleting the dataset from a device that downloaded the dataset; and encrypting the dataset.

When the comparison results in the machine-computed security level classification being the same as the user-generated security level classification, the one or more actions comprise continuously monitoring a current security level classification of the dataset.

In addition, the one or more actions comprise tracking a location of the dataset. Still further, the one or more actions comprise applying a severity level to the dataset based on the comparison, wherein the severity level is automatically selected from a plurality of severity levels and represents a degree of need for review of the dataset.

Figure 9:
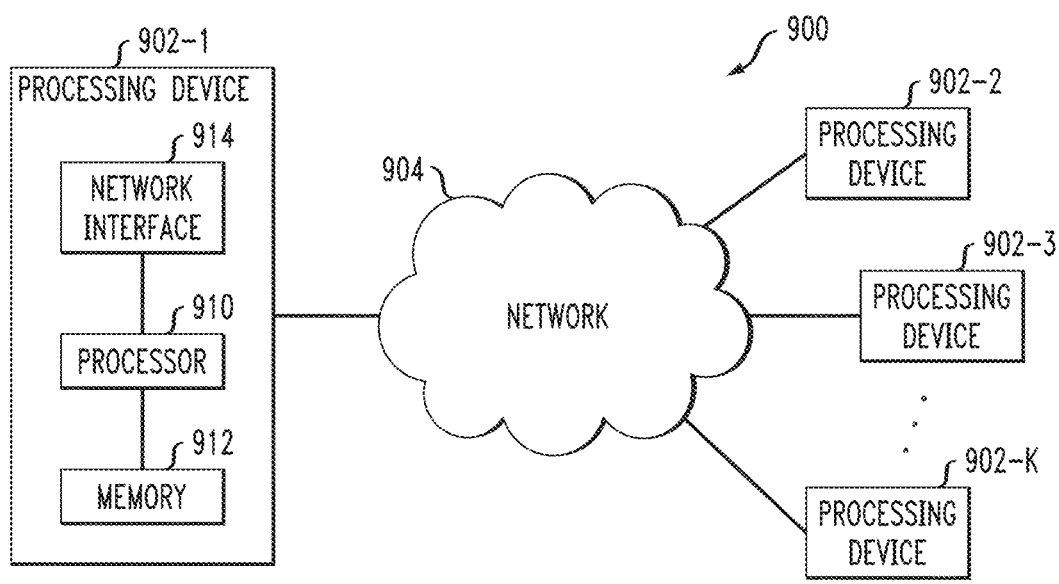
FIG. 9 shows an example of a processing platform that may be utilized to implement at least a portion of an information processing system for artificial intelligence-based data security management functionalities according to an illustrative embodiment.

FIG. 9 depicts a processing platform 900 used to implement information processing systems/processes according to an illustrative embodiment, e.g., as depicted in FIGS. 1-8. More particularly, processing platform 900 is a processing platform on which a computing environment with functionalities described herein can be implemented.

The processing platform 900 in this embodiment comprises a plurality of processing devices, denoted 902-1, 902-2, 902-3, . . . 902-K, which communicate with one another over network(s) 904. It is to be appreciated that the methodologies described herein may be executed in one such processing device 902, or executed in a distributed manner across two or more such processing devices 902. It is to be further appreciated that a server, a client device, a computing device or any other processing platform element may be viewed as an example of what is more generally referred to herein as a "processing device." As illustrated in FIG. 9, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 902 shown in FIG. 9. The network(s) 904 represent one or more communications networks that enable components to communicate and to transfer data therebetween, as well as to perform other functionalities described herein.

The processing device 902-1 in the processing platform 900 comprises a processor 910 coupled to a memory 912. The processor 910 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 910. Memory 912 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 912 may comprise electronic memory such as random-access memory (RAM), read-only memory (ROM) or other types of memory, in any combination. The one or more software programs when executed by a processing device such as the processing device 902-1 causes the device to perform functions associated with one or more of the components/steps of system/methodologies in FIGS. 1-8. One skilled in the art would be readily able to implement such software given the teachings provided herein. Other examples of processor-readable storage media embodying embodiments of the invention may include, for example, optical or magnetic disks.

Processing device 902-1 also includes network interface circuitry 914, which is used to interface the device with the networks 904 and other system components. Such circuitry may comprise conventional transceivers of a type well known in the art.

The other processing devices 902 (902-2, 902-3, . . . 902-K) of the processing platform 900 are assumed to be configured in a manner similar to that shown for computing processing device 902-1 in the figure.

The processing platform 900 shown in FIG. 9 may comprise additional known components such as batch processing systems, parallel processing systems, physical machines, virtual machines, virtual switches, storage volumes, etc. Again, the particular processing platform shown in this figure is presented by way of example only, and the system shown as processing platform 900 in FIG. 9 may include additional or alternative processing platforms, as well as numerous distinct processing platforms in any combination.

Also, numerous other arrangements of servers, clients, computers, storage devices or other components are possible in processing platform 900. Such components can communicate with other elements of the processing platform 900 over any type of network, such as a wide area network (WAN), a local area network (LAN), a satellite network, a telephone or cable network, or various portions or combinations of these and other types of networks.

Furthermore, it is to be appreciated that the processing platform 900 of FIG. 9 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 900 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-9 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
at least one processing device comprising a processor coupled to a memory, the at least one processing device, when executing program code, is configured to:
download a dataset from a data source;
detect whether or not the dataset contains at least a subset of data of a given security-based data type, wherein the detection is performed in accordance with an artificial intelligence model;
generate a machine-computed security level classification for the dataset by automatically selecting one of a plurality of security level classifications based on the detection;
compare the machine-computed security level classification with a user-generated security level classification manually selected from the plurality of security level classifications;
cause one or more actions to be taken based on the comparison; and
create a unique identifier for the dataset to track a location of the dataset, the unique identifier comprising a user identification and a timestamp;
wherein, when the generated machine-computed security level classification is a restricted security level classification, the one or more actions comprise relocating the dataset based on the unique identifier from a device that downloaded the dataset to a secure storage location.

2. The apparatus of claim 1, wherein, when the comparison results in the machine-computed security level classification being more restricted than the user-generated security level classification, the one or more actions comprise causing a review of the dataset.

3. The apparatus of claim 2, wherein, following the review, the one or more actions comprise changing a current security level classification of the dataset.

4. The apparatus of claim 1, wherein, when the comparison results in the machine-computed security level classification being less restricted than the user-generated security level classification, the one or more actions comprise retraining the artificial intelligence model.

5. The apparatus of claim 1, wherein, when the machine-computed security level classification is one of one or more restricted security level classifications, the one or more actions comprise deleting the dataset from a device that downloaded the dataset.

6. The apparatus of claim 1, wherein, when the machine-computed security level classification is one of one or more restricted security level classifications, the one or more actions comprise encrypting the dataset.

7. The apparatus of claim 1, wherein, when the comparison results in the machine-computed security level classification being the same as the user-generated security level classification, the one or more actions comprise continuously monitoring a current security level classification of the dataset.

8. The apparatus of claim 1, wherein the one or more actions comprise tracking a location of the dataset.

9. The apparatus of claim 1, wherein the one or more actions comprise applying a severity level to the dataset based on the comparison, wherein the severity level is automatically selected from a plurality of severity levels and represents a degree of need for review of the dataset.

10. The apparatus of claim 1, wherein the given security-based data type comprises personally identifiable information.

11. The apparatus of claim 1, wherein the given security-based data type comprises entity-sensitive information.

12. A method comprising:
downloading a dataset from a data source;
detecting whether or not the dataset contains at least a subset of data of a given security-based data type, wherein the detection is performed in accordance with an artificial intelligence model;
generating a machine-computed security level classification for the dataset by automatically selecting one of a plurality of security level classifications based on the detection;
comparing the machine-computed security level classification with a user-generated security level classification manually selected from the plurality of security level classifications;
causing one or more actions to be taken based on the comparison; and
creating a unique identifier for the dataset to track a location of the dataset, the unique identifier comprising a user identification and a timestamp;
wherein, when the generated machine-computed security level classification is a restricted security level classification, the one or more actions comprise relocating the dataset based on the unique identifier from a device that downloaded the dataset to a secure storage location.

13. The method of claim 12, wherein, when the comparison results in the machine-computed security level classification being more restricted than the user-generated security level classification, the one or more actions comprise causing a review of the dataset.

14. The method of claim 12, wherein, when the comparison results in the machine-computed security level classification being less restricted than the user-generated security level classification, the one or more actions comprise retraining the artificial intelligence model.

15. The method of claim 12, wherein, when the machine-computed security level classification is one of one or more restricted security level classifications, the one or more actions comprise at least one of:
deleting the dataset from a device that downloaded the dataset; and
encrypting the dataset.

16. The method of claim 12, wherein, when the comparison results in the machine-computed security level classification being the same as the user-generated security level classification, the one or more actions comprise continuously monitoring a current security level classification of the dataset.

17. The method of claim 12, wherein the one or more actions comprise tracking a location of the dataset.

18. The method of claim 12, wherein the one or more actions comprise applying a severity level to the dataset based on the comparison, wherein the severity level is automatically selected from a plurality of severity levels and represents a degree of need for review of the dataset.

19. A computer program product comprising a non-transitory processor-readable storage medium having stored therein program code of one or more software programs, wherein the program code when executed by at least one processing device cause the at least one processing device to:
- download a dataset from a data source;
- detect whether or not the dataset contains at least a subset of data of a given security-based data type, wherein the detection is performed in accordance with an artificial intelligence model;
- generate a machine-computed security level classification for the dataset by automatically selecting one of a plurality of security level classifications based on the detection;
- compare the machine-computed security level classification with a user-generated security level classification manually selected from the plurality of security level classifications;
- cause one or more actions to be taken based on the comparison; and
- create a unique identifier for the dataset to track a location of the dataset, the unique identifier comprising a user identification and a timestamp;
- wherein, when the generated machine-computed security level classification is a restricted security level classification, the one or more actions comprise relocating the dataset based on the unique identifier from a device that downloaded the dataset to a secure storage location.

20. The computer program product of claim 19, wherein, when the comparison results in the machine-computed security level classification being more restricted than the user-generated security level classification, the one or more actions comprise causing a review of the dataset.

* * * * *